May 16, 1961 E. L. FOSTER ET AL 2,984,250
WATER TREATING SYSTEM
Filed Sept. 16, 1957
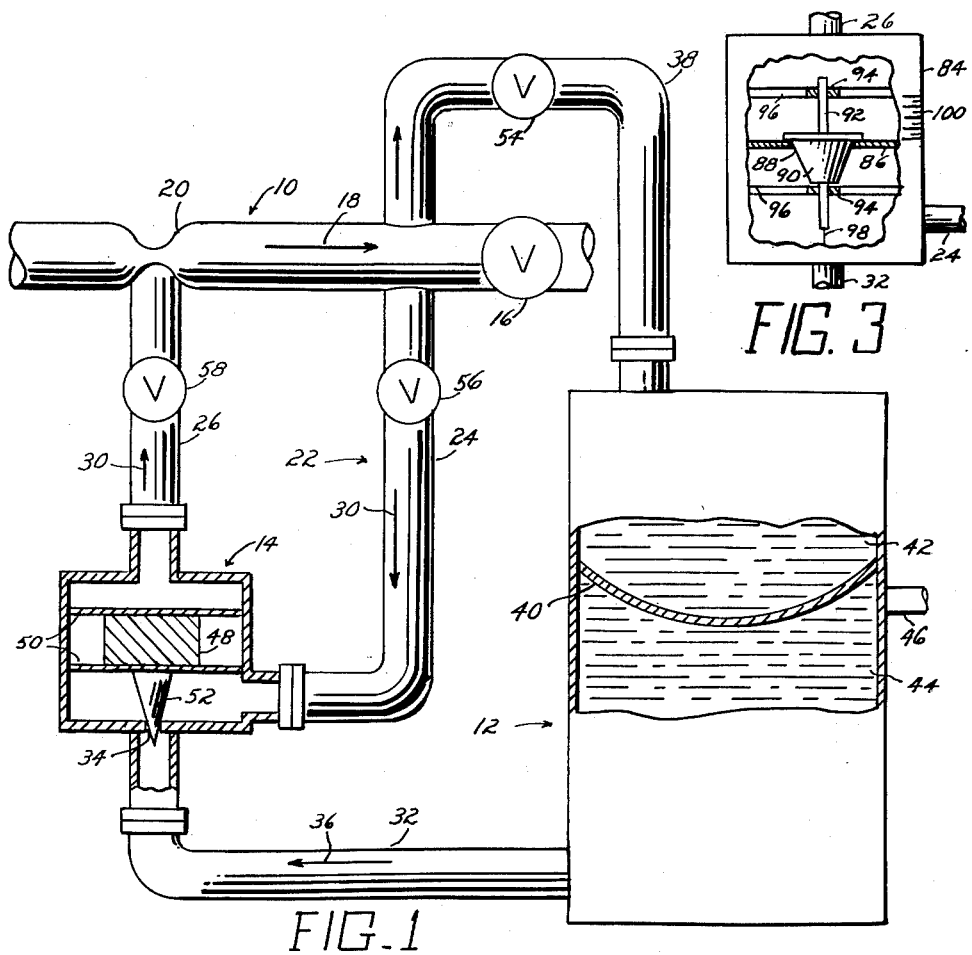
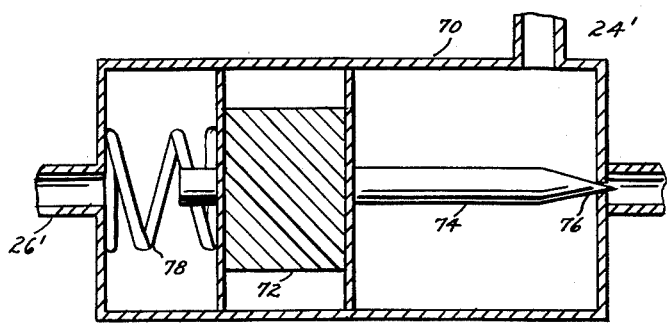
INVENTORS
EUGENE L. FOSTER
ROBERT J. KROOSS
BY EDWARD H. NAHIKIAN United States Patent Office 2,984,250
Patented May 16, 1961

2,984,250

WATER TREATING SYSTEM

Eugene L. Foster, Still River, Mass.; Robert J. Krooss, 9 Mountain View Drive, Westfield, N.J., and Edwin H. Nahikian, 20 Bellington St., Arlington, Mass.

Filed Sept. 16, 1957, Ser. No. 684,335

15 Claims. (Cl. 137—101.11)

This invention relates to means for adding a liquid in relatively small quantities to another liquid which is handled in relatively large quantities, and more particularly comprises a new and improved device for combining such liquids when the liquid handled in small quantities is difficult to meter because it has a tendency to clog small passages.

An example of such a liquid is sodium silicate in a concentrated water solution. Whenever a concentrated sodium silicate solution flows through a passage and is exposed to the presence of even small quantities of air, such as the dissolved air in a typical water system, the silicate builds up on the surfaces of the passage. This build up continues until the small passage or a very small orifice in the passage becomes either clogged or too small for proper operation. It is to be understood that numerous other liquids behave in a like manner and give rise to the same or similar problems.

One application of our invention is as a home or industrial water conditioning device. Although the use of sodium silicate would seem to be an obvious substitution for the ion exchange method now in use for conditioning and more particularly softening water, various problems associated with the introduction of a sodium silicate solution into a water supply have heretofore made it impossible to employ successfully what otherwise appears to be a very direct and simple method.

Another application of our invention is as a mechanism for adding a sodium silicate solution to boiler feed water. Sodium silicate in the boiler water retards scale build up on the interior of the boiler tubes. It should also be noted that corrosion problems which have been present with marine engines can be reduced by the use of a sodium silicate solution. Our invention provides a ready means for introducing the solution into the cooling water of such engines.

The primary object of our invention is to provide a relatively simple, compact and inexpensive system for mixing together and closely controlling the ratio between one liquid which is handled in relatively small quantities and another liquid which is handled in relatively large quantities.

Another important object of our invention is to provide means for cleaning an orifice through which a liquid to be handled in small quantities passes on its way from a source to a line carrying another liquid.

Still another important object of our invention is to provide a simple means for controlling the rate of flow of a liquid handled in small quantities into a line carrying a liquid in much larger quantities.

To accomplish these and other objects, our invention includes among its important features a venturi disposed in the main liquid supply line. A conduit having one end secured to the main line at the low pressure point of the venturi and its other end connected to a higher pressure area of the line, is interrupted by a housing which serves as a mixing chamber for the two liquids. A valve is disposed in that conduit between the venturi and the housing and controls the pressure drop across the housing. A supply tank for the liquid which is handled in relatively small quantities is connected by another conduit which terminates in an orifice formed in the wall of the housing to the high pressure side of that housing. A float is disposed within the housing and carries a needle which is adapted to extend through the orifice. The float is biased to a position wherein it positions the needle in the orifice and in this manner the orifice is kept free of any substantial deposits. The float under the influence of a pressure drop across the housing withdraws the needle from the orifice.

The supply tank is connected by still another conduit to the main line and is pressurized by means of the main line liquid which is fed to it. In one embodiment of our invention a membrane extends across the tank and divides it into two chambers, one containing the liquid handled in small quantities while the other contains the liquid in the main line which is fed to the tank by the conduit. Another valve is disposed within the first conduit on the upstream side of the valve housing and is adapted to control the pressure difference between the supply tank and the housing. Still another valve may be disposed in the conduit between the main line and the tank to facilitate filling of the tank. By means of the valves very precise control of the relative pressures within the tank and housing and the pressure drop across the housing is available.

These and other objects and features of our invention along with incident advantages will be better understood and appreciated from the following detailed description of a number of embodiments thereof, selected for purposes of illustration and shown in the accompanying drawings in which Figure 1 is a diagrammatic view partially in section of a system constructed in accordance with our invention; and Figures 2 and 3 are fragmentary views in section of different modifications of one element of the system shown in Figure 1.

The following detailed description of the system shown in the drawings will for purposes of clarity be directed to the manner in which it is used to introduce a sodium silicate solution into a domestic water supply. However, it is to be understood that this approach is in no way intended to confine the breadth of our invention to that specific application for the system has a wide variety of applications.

The embodiment of our invention illustrated in Figure 1 includes in its general organization a main water line 10, a storage tank 12 for the liquid to be handled in relatively small quantities, in this example the sodium silicate, and a mixing housing 14. A manually controlled valve 16 is disposed in the main line 10 and controls the rate of flow of the water through the line. The valve 16 is merely symbolic of any one of a number of such valves in a domestic water supply system, which permits the occupants to draw water from the line as desired. In all applications of our invention, the flow in the main line is in fact an interrupted flow. For descriptive purposes only, we will assume that the water flows through line 10 in the direction of arrow 18.

A low pressure area is created in the main line 10 by means of a venturi 20. A conduit 22 sub-divided into two portions 24 and 26 by the housing 14 has the end of the portion 26 connected to the main line 10 at the venturi 20 and the end of the portion 24 connected to the main line at a higher pressure area. The conduit 22 in effect forms a branch of the main line and part of the water flowing in the line circulates through this branch in the direction of the arrows 30. It should be noted that the inlet end of the portion 24 of the conduit 22 could be connected to the other side of the venturi without effecting the operation of the system.

The housing 14 and the storage tank 12 are interconnected by a conduit 32 which terminates at an orifice 34 formed in the housing wall. As will be described later, the flow through conduit 32 should be confined to a direction from the tank 12 to the housing 14 represented by the arrows 36. Still a third conduit 38 is connected between the main line 10 and the top of the tank 12. The conduit 38 taps into the main line at the approximate location of the portion 24 of the conduit 22. Thus, the pressure heads in the conduits 22 and 38 are of approximately the same magnitude.

A thin and extremely flexible and stretchable membrane 40 extends across the storage tank 12 and subdivides that tank into two compartments 42 and 44. The lower compartment 44 normally contains the sodium silicate to be introduced into the main water line and spout 46 in one wall of the tank provides access to the lower compartment.

A float or plug 48 supported on a pair of spiders 50 is free to move up and down in the housing 14. The spiders merely serve to guide the plug in its movement in the housing and countless other expedients could be used for this purpose. Depending from the plug 44 is a needle 52 which is small enough to extend through the orifice 34 when the plug is in its lower position. As has been suggested in the introductory portion of the specification, the needle 52 cleans the orifice 34 whenever it is moved into the orifice by the float 48.

A number of valves 54, 56 and 58 are disposed respectively in the conduit 38 and the portions 24 and 26 of the conduit 22. The valve 54 in the conduit 38 is normally wide open. The valve 56 permits very fine adjustment of the pressure differential between the tank and the housing while each of the valves 56 and 58 permits close control of the pressure drop across the housing.

As described earlier, the tank 12 is subdivided into two compartments 42 and 44. The compartment 42 is in direct communication with the main line 10 by means of the conduit 38 and the pressure head of the water in the compartment 42 controls the pressure in the tank. The pressure drop across the orifice 34 is primarily controlled by the valve 56. This pressure drop is critical in the design of our invention for it controls the rate of flow of the silicate from the tank 12 to the housing 14. Because the rate of flow of the silicate is very small, the tank 12 in effect forms a dead end for the conduit 38, and substantially no flow occurs in it. As a result, very fine adjustment may be made of the pressure drop across the orifice 34 merely by means of the valve 56. This pressure control may be in the range of one or two inches of water.

Because the portion 26 of the conduit 22 is connected directly to the venturi 20, the pressure in the portion 26 is considerably less than that in the portion 24 of the conduit 22. By opening the valve 58 the pressure in the portion 26 decreases and this drop is reflected back into the housing 14 to create a larger pressure drop between the discharge end of the portion 24 of conduit 22 (the inlet side of the housing) and the inlet side of the portion 26 (the outlet side of the housing). When an adequate pressure drop between the inlet and outlet sides of the housing is created by adjustment of the valve 58, the plug 48 will rise against the gravitational forces acting on it and lift the needle 52 out of the orifice 34. Just so long as this pressure drop is maintained, the needle 52 will remain withdrawn from the orifice but if the pressure drop falls below the required amount, the plug will fall in the housing 14 and the needle will re-enter the orifice. Each time the needle 52 passes through the orifice 34 any deposits which have built up in the orifice will be removed.

In operation, the system works as follows. When valve 16 is closed, no flow occurs in the main line 10 nor in the conduits 38 and 22. As a result, the pressure throughout the system is equal and the plug 48 remains in its lower position with the needle 52 in the orifice. When the valve 16 is opened, allowing flow to occur in the main line, pressure builds up in the tank 12 and in the inlet side of the housing 14. The valve 54 is opened and the valve 56 is adjusted so that with the flow in the main line a small pressure drop is created across the orifice. The valve 58 is also adjusted to create the necessary pressure drop across the housing. The pressure drop across the housing may be several times greater than the pressure drop across the orifice. Because the valve 16 is open, water flows through the portion 24 of the conduit 22, the housing 14 and the portion 26. The pressure drop in the housing causes the plug 48 to move upwardly within the housing 14 and remove the needle 52 from the orifice 34. The resulting flow of the silicate from the tank 12 into the housing 14 is picked up by the main flow of water through the conduit 22 and carried to the main line. As the quantity of silicate in the compartment 44 reduces over prolonged periods, the membrane 40 will stretch so as to cause the continuous exertion of pressure by the water in the compartment 42 on the silicate. When the valve 16 once again is closed, the pressures in the lines equalize and the plug 48 drops in the housing and returns the needle 52 into the orifice 34. Because the flow in the main line is periodically interrupted in every application of our invention, the needle 52 will be inserted through the orifice 34 many times. As a result, constant cleaning is afforded the system.

In the embodiment of Figure 1, the needle 52 is inserted into the orifice 34 under the influence of gravitational forces working on it. However, the arrangement shown in Figure 2 will work equally as well. The housing 70 in Figure 2 contains a plug 72 and a needle 74 which are substantially identical to the elements in the housing 14. However, the needle 74 is urged into the orifice 76 by means of a spring 78 rather than gravity. The action of this spring is overcome in the same way as has been described in connection with the embodiment of Figure 1, i.e., by means of a pressure drop across the housing. This pressure drop between the outlet of conduit 24' and the inlet of conduit 26' is controlled by a valve (not shown) in the conduit 26' identical to valve 58.

In Figure 3 we have illustrated still another embodiment of a mixing valve which may be incorporated into the system shown in Figure 1 in place of the mixing valve 14. The mixing valve shown in Figure 3 includes a casing 84 which preferably is made of some transparent material such as a clear plastic. A partition 86 extends across the casing and has an opening 88 formed in its center. A truncated cone-shaped valve 90 is seated in the opening and its smaller end extends through the opening. Extending axially through the cone is a shaft 92 having its ends disposed in the hubs 94 of spiders 96. The spiders and the shaft serve to confine movement of the valve 90 to an axial direction.

It will be noted in the drawing that the casing 84 is connected into the system shown in Figure 1 in the same manner as the housing 14, and that conduits 24, 26 and 32 are each connected to it. The conduit 32 as in the embodiments previously described terminates in an orifice (not shown) formed in the lower wall of the casing 84 and is adapted to be cleaned by a needle 98 which depends from the bottom of the shaft 92.

Before describing the operation of this mixing valve, the reader should appreciate that in an actual installation of the system such as in a domestic water supply, the valves 56 and 58 may merely be on-off valves and perform no regulating function. At the time of installation of the system, the service man may provide for the necessary pressure drops across the valve casing and across the orifice by crimping the conduit 22 on either or both sides of the casing. Thereafter the ratio of silicate to water, or of any liquids used, will remain approximately constant, even with changes in pressure head of the liquid in the main line.

Returning now to the description of the embodiment of Figure 3, those skilled in the art will appreciate that in such an installation, the displacement of the valve 90 will always be proportional to the amount of liquid which flows through the opening 88 in the partition 86 for the effective size of that opening is determined by the distance the truncated cone-shaped valve is raised in the casing. Furthermore, because the total flow through the opening 88 is proportional to the amount of the liquid flowing into the casing 84 from the tank, the displacement of the valve is proportional to the flow of the liquid handled in small quantities. By constructing the case of transparent material and providing calibrations adjacent to the valve, the amount of flow from the tank can readily be determined.

From the foregoing description, those familiar with the art will appreciate that numerous modifications may be made of our invention without departing from its spirit. For example, although we have illustrated a membrane 40 within the tank 12 to separate the two liquids, such a membrane may in many cases be eliminated. Because substantially no flow exists in the tank 12, there is no agitation of the liquids and these two materials may form an interface with negligible intermixing. Moreover, although we have suggested the use of a sodium silicate solution as an example of the type of liquid which is handled in small quantities, silicate powder deposited on the bottom of the tank 12 could be used. In fact, the apparatus is well suited for use in systems wherein the liquid used in smaller quantities bears undissolved particles. In such cases, the particles often clog the orifice by building up on the sides or larger than standard particles wedge in the orifice, and the needle periodically inserted through the orifice will correct such conditions. Because numerous modifications may be made, we do not intend to limit the breadth of our invention to the embodiments illustrated and described. Rather it is our intention that the scope of this invention be determined by the appended claims and their equivalents.

What we claim as new and desire to secure by Letters Patent of the United States is:

1. Apparatus for adding together and closely controlling the ratio between a liquid which is handled in small quantities and another liquid which is handled in relatively large quantities and flows through a main conduit comprising a venturi formed in the main conduit, a valve in the main conduit controlling the rate of flow through the main conduit, a tank, a liquid to be handled in relatively small quantities within the tank, a duct connected between the main conduit and the tank for introducing the main conduit liquid to the tank, means separating the main conduit liquid in the tank from the liquid which is handled in small quantities and enabling the main conduit liquid to control the pressure in the tank, a mixing valve housing having an orifice formed in one end, a second duct connected between the tank and the housing at the orifice, a float within the housing and carrying a needle fittable within and extendable through the orifice for periodically cleaning the orifice and controlling the flow of the liquid handled in small quantities from the tank to the housing, means biasing the float to a position wherein the needle enters the orifice to clean it and prevent flow of the liquid handled in small quantities, a third duct connected adjacent the orifice to the housing and to the main line, a fourth duct connected to the housing remote from the orifice and to the venturi, said third and fourth ducts directing the liquid in the main conduit through the mixing housing, and valves in the first named third and fourth ducts for controlling the relative pressures of the housing and the tank and the pressure drop across the housing.

2. Apparatus of the class described comprising a main liquid supply line, a venturi formed in the line, a tank for storing material to be introduced into the main line, a mixing housing, means including an orifice interconnecting the bottom of the tank and one end of the housing for carrying the material to the housing, a first duct interconnecting the other end of the housing and the venturi, a second duct interconnecting said one end of the housing with the main line, said first and second ducts directing liquid from the main line through the housing for picking up the material, a third duct interconnecting the main line and the tank, means formed in the second duct controlling the pressure drop across the orifice for regulating the flow of material from the tank to the housing, means formed in the first duct for controlling the pressure drop across the housing, a needle disposed within the housing suitable within and extendable through the orifice for cleaning the orifice and controlling flow through it, and means movable in response to a pressure drop across the housing and carrying the needle for removing the needle from the orifice.

3. Apparatus of the class described comprising a main water line, a storage tank, a flexible member disposed within the tank and dividing the tank into two chambers, a liquid disposed in one of the chambers to be introduced into the line, a mixing valve housing, means including an orifice interconnecting the one chamber and one side of the housing for introducing the liquid to the housing, means forming a low pressure area in the main line, a first conduit interconnecting the opposite side of the housing and the low pressure area in the main line, a second conduit interconnecting the main line and intermediate portion of the housing for directing water through the housing, a third conduit interconnecting the main line and the other chamber within the tank, means disposed in at least one of the first and second conduits for controlling the pressure drop between the tank and the housing across the orifice and the pressure drop across the housing, and means disposed within the housing and movable in and out of the orifice in response to changes in the pressure drop across the housing.

4. Apparatus as defined in claim 3 further characterized by means biasing the last named means to a position wherein it lies in and cleans the orifice.

5. Apparatus for introducing a material stored within a supply tank to a line carrying a fluid comprising a valve housing, a first conduit for interconnecting one side of the housing to the tank, an orifice limiting the flow of the material from the tank to the housing through the conduit, a second conduit interconnecting the main line and said one side of the housing, means for controlling the pressure in the tank, a low pressure area formed in the line, a third conduit for interconnecting the low pressure area within the line and the other side of the housing, said second and third conduits directing the line fluid through the housing to mix with the material in the housing, means disposed in at least one of the second and third conduits controlling the pressure drop across the housing and between the tank and the housing across the orifice, and means disposed within the housing and including a needle normally extending through the orifice for cleaning the orifice and responsive to the pressure drop across the housing for moving the needle out of the orifice.

6. Apparatus comprising a supply line carrying a fluid, a tank storing material to be mixed with the fluid, means for maintaining the pressure in the tank equal to the pressure in the supply line, a venturi formed in the line, a conduit having one end connected to the venturi and its other end connected to a higher pressure area in the line, a valve housing disposed in the conduit through which a portion of the line fluid passes, said housing having high and low pressure areas caused by fluid flow through the conduit and the location of the connections of the ends of said conduit to the line, means including an orifice interconnecting the tank and the high pressure side of the valve housing for carrying material to the housing, a needle disposed within the housing biased to a position wherein the needle extends through the orifice for cleaning the orifice, and means responsive to a pressure drop across the housing caused by the flow of fluid through the conduit for moving the needle out of the orifice.

7. Apparatus as defined in claim 6 further characterized by the first recited means including a conduit interconnecting a higher pressure area of the line with the tank for applying the line pressure to the tank.

8. Apparatus as defined in claim 6 further characterized by at least one valve disposed within the conduit for controlling the pressure drop for the tank to the housing across the orifice.

9. Apparatus as defined in claim 6 further characterized by at least one valve disposed in the conduit for controlling the pressure drop across the housing.

10. Apparatus as defined in claim 6 further characterized by means disposed in the conduit for controlling the pressure drop across the housing and from the tank to the housing across the orifice.

11. Apparatus comprising a supply line carrying a fluid, a tank storing material to be mixed with the fluid, means for maintaining the pressure in the tank equal to the pressure in the supply line, means forming a low pressure area in the line, a conduit having one end connected to the low pressure area and its other end connected to a higher pressure area in the line, a mixing housing disposed in the conduit and through which the fluid is directed, said housing having high and low pressure areas caused by fluid flow through the conduit and the location of the connections of the ends of said conduit to the line, means including an orifice interconnecting the tank and the high pressure side of the mixing housing fr directing the material to the housing, a partition extending across the housing between the high and low pressure areas, an opening formed in the partition, a tapered valve plug seated on the partition with its narrower end extending through the opening, said plug being biased to a position wherein it is seated on the partition and closes said opening, and moving against its bias in response to the unequal pressures in the housing to gradually open the opening, and means connected to the tapered valve plug and extending through the orifice for cleaning the orifice when the plug is disposed in its biased position and moving out of the orifice when the plug is moved from its biased position.

12. A device as defined in claim 11 further characterized by means disposed in the conduit for controlling the pressure drop across the housing.

13. A device as defined in claim 11 further characterized by means disposed in the conduit for controlling the pressure drop between the tank and the housing across the orifice.

14. A device as defined in claim 11 further characterized by means formed on the housing adjacent the plug and indicating the distance the plug moves from its biased position.

15. Apparatus for introducing a material stored within a supply tank to a line carrying a fluid comprising a valve housing, a first conduit for interconnecting one side of the housing to the tank, an orifice limiting the flow of the material from the tank to the housing through the conduit, a second conduit interconnecting the main line and said one side of the housing, means for controlling the pressure in the tank, a low pressure area formed in the line, a third conduit for interconnecting the low pressure area in the line and the other side of the housing, said second and third conduits directing the line fluid through the housing to mix with the material in the housing, means disposed in at least one of the second and third conduits controlling the pressure drop across the housing and between the tank and the housing across the orifice, and means disposed within the housing and including a needle normally extending through the orifice for cleaning the orifice and responsive to the flow of fluid through the housing for moving the needle out of the orifice.

References Cited in the file of this patent

UNITED STATES PATENTS

| 1,443,675 | Bowler | Jan. 30, 1923 |
| 1,693,647 | Farmer | Dec. 4, 1928 |
| 1,897,492 | Ledoux | Feb. 14, 1933 |
| 2,058,508 | Rolle | Oct. 27, 1936 |
| 2,573,299 | Bast | Oct. 30, 1951 |
| 2,614,885 | Roell | Oct. 21, 1952 |
| 2,679,835 | Thorner | June 1, 1954 |
| 2,710,016 | Gallmeyer | June 7, 1955 |

FOREIGN PATENTS

| 576,560 | Great Britain | Apr. 10, 1946 |
| 815,472 | Germany | Oct. 1, 1951 |